(12) United States Patent
Itadani

(10) Patent No.: US 9,341,311 B2
(45) Date of Patent: May 17, 2016

(54) COMPRESSED AIR SUPPLY APPARATUS

(71) Applicant: UD TRUCKS CORPORATION, Ageo-shi, Saitama (JP)

(72) Inventor: Shohji Itadani, Tokyo (JP)

(73) Assignee: UD TRUCKS CORPORATION, Ageo-shi (JP)

( * ) Notice: Subject to any disclaimer, the term of this patent is extended or adjusted under 35 U.S.C. 154(b) by 338 days.

(21) Appl. No.: 13/896,657

(22) Filed: May 17, 2013

(65) Prior Publication Data

US 2013/0333781 A1    Dec. 19, 2013

Related U.S. Application Data

(63) Continuation of application No. PCT/JP2010/070810, filed on Nov. 22, 2010.

(51) Int. Cl.
  *F17C 1/00* (2006.01)
  *F04B 39/16* (2006.01)

(52) U.S. Cl.
  CPC . *F17C 1/00* (2013.01); *F04B 39/16* (2013.01); *Y10T 137/86051* (2015.04)

(58) Field of Classification Search
  CPC ... B60T 17/004; B60T 17/002; B01D 53/265; B60H 1/32
  See application file for complete search history.

(56) References Cited

U.S. PATENT DOCUMENTS 4,448,757 A * 5/1984 Barnwell et al. ............ 423/247
5,918,472 A * 7/1999 Jonqueres ..................... 62/87
6,705,839 B1 * 3/2004 Eriksson ....................... 417/53
2008/0087040 A1 * 4/2008 Oshitani et al. ............... 62/500
2010/0000243 A1 * 1/2010 Morimoto et al. .......... 62/176.6

FOREIGN PATENT DOCUMENTS

| JP | 05-201329 A | 8/1993 |
| JP | 07-185245 A | 7/1995 |
| JP | 3268305 B2 | 1/2002 |
| JP | 3268305 B2 | 3/2002 |

(Continued)

OTHER PUBLICATIONS

Chinese Office Action with English Language Translation dated Jan. 22, 2015, 13 pgs.

(Continued)

*Primary Examiner* — Ljiljana Ciric
*Assistant Examiner* — Alexis Cox
(74) *Attorney, Agent, or Firm* — Foley & Lardner LLP

(57) ABSTRACT

A compressed air supply apparatus includes an air compressor for compressing air to at least atmospheric pressure, a tank for storing the compressed air and supplying the compressed air, via a supply port, to various devices that use the compressed air as a working fluid, a first pipe that connects the air compressor to the tank, a heat pump including an evaporator for cooling at least a part of the first pipe, a selection device for selecting whether a cool air cooled by the evaporator, which is fluidly distinct from the compressed air, is introduced into a vehicle interior or discharged outside of the vehicle interior, and a control device configured to control the selection device so that the cool air is introduced into the vehicle interior when an air conditioner switch is turned ON and discharged outside of the vehicle interior when the air conditioner switch is turned OFF.

5 Claims, 6 Drawing Sheets

(56) References Cited

FOREIGN PATENT DOCUMENTS

| JP | 2006-212610 A | 8/2006 |
| JP | 2007-100511 A | 4/2007 |

OTHER PUBLICATIONS

Japanese Office Action with partial English language translation dated Mar. 18, 2014 (5 pgs.).

* cited by examiner

COMPRESSED AIR SUPPLY APPARATUS

This application is a continuation application of PCT/JP2010/070810, filed on Nov. 22, 2010.

BACKGROUND OF THE INVENTION

1. Field of the Invention

The present invention relates to a compressed air supply apparatus for supplying a compressed air as a working fluid.

2. Description of Related Art

In various apparatuses that are actuated by a compressed air as a working fluid, when a compressed air containing a large amount of oil and water is supplied, for example, a valve and the like may be corroded. To deal with this problem, as described in Japanese Laid-Open (Kokai) Patent Application Publication No. H5(1993)-201329, compressed air supply apparatus employ oil mist separators and air dryers to remove the oil and the water contained in a compressed air discharged from an air compressor.

However, although such oil mist separators and dryers can remove an oil content and a water content having certain particle sizes, it is difficult to remove all of fine particles of an oil content and a water content having smaller particle sizes. When a compressed air containing fine particles of oil content and water content is supplied to various devices, corrosion of, for example, a valve, may still be of concern.

SUMMARY OF THE INVENTION

Under these circumstances, considering the above problem in the art, it is an object of the present invention to provide a compressed air supply apparatus which can remove fine particles of oil content and water content in compressed air.

To solve the above problem, the compressed air supply apparatus includes: an air compressor that compresses an air to at least atmospheric pressure; and a tank that stores a compressed air produced by the air compressor and has a supply port for supplying the compressed air to various devices that use the compressed air as a working fluid. Furthermore, at least a part of a first pipe through which the air compressor communicates with the tank is cooled by an evaporator constituting a heat pump of an air conditioner.

According to the compressed air supply apparatus, a compressed air produced by an air compressor and thereby having a high temperature is cooled by an evaporator constituting a heat pump to a temperature at which an oil content and a water content are condensed or a lower temperature. Accordingly, when the compressed air is supplied to the tank, the oil content and the water content are condensed and adhere to the inner wall of the tank. The oil content and the water content adhered to the inner wall of the tank are accumulated by gravity at a lower portion of the tank and are removed. Here, since the oil content and the water content are removed by using condensation, they can be removed even if they have fine particle sizes.

DESCRIPTION OF THE PREFERRED EMBODIMENTS

Hereunder embodiments for carrying out the invention will be described in detail with reference to accompanying drawings.

Figure 1:
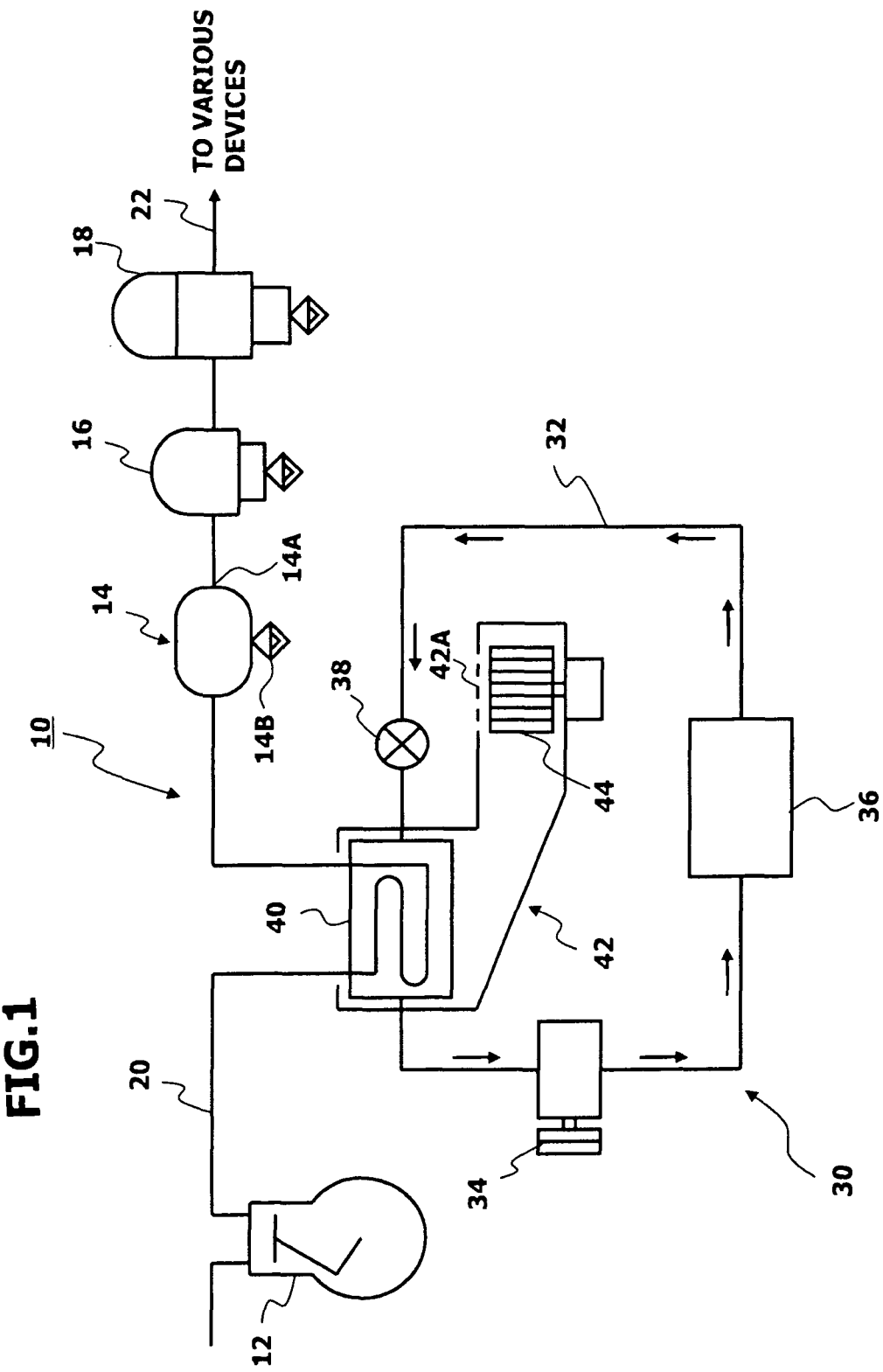
FIG. 1 is a schematic view of a vehicle on which a compressed air supply apparatus according to a first embodiment is mounted.

FIG. 1 schematically illustrates a vehicle on which a compressed air supply apparatus is mounted.

A compressed air supply apparatus 10 has an air compressor 12, a tank 14 having a predetermined capacity, an oil mist separator 16 for removing an oil content contained in a compressed air, and an air dryer 18 for removing a water content contained in the compressed air.

The air compressor 12, for example, compresses an air from which foreign objects have been filtered out by an air filter, to at least atmospheric pressure. The compressed air produced by the air compressor 12 is supplied through a first pipe 20 to the tank 14 and temporarily stored in the tank 14. On a peripheral wall of the tank 14, a delivery port 14A is provided, which supplies a compressed air to various apparatuses such as air cylinders using the compressed air as a working fluid. Furthermore, on a bottom portion of the tank 14, an auto drain valve 14B is provided, which discharges a liquid such as an oil content and a water content periodically (for example, at predetermined time intervals). In a second pipe 22 connected to the delivery port 14A of the tank 14, an oil mist separator 16 and an air dryer 18 are disposed in this order along a supply direction of the compressed air.

Further, a heat pump 30 of an air conditioner is constituted by at least a compressor 34, a condenser 36, an expansion valve 38 and an evaporator 40, which are provided in a pipe 32 constituting a closed circuit through which a refrigerant is circulated. As the refrigerant, HFC-134a (R134a) that does not damage the ozone layer is employed.

The compressor 34 compresses a refrigerant in a form of low pressure-low temperature gas into a high pressure-high temperature gas. The condenser 36 cools the refrigerant that has changed into the high pressure-high temperature gas by the compressor 34, to a condensation point to change the refrigerant into a high pressure-normal temperature liquid. The expansion valve 38 rapidly expands the refrigerant that has changed into the high pressure-normal temperature liquid by the condenser 36, to change the refrigerant into a low pressure-low temperature gas. The evaporator 40 makes the refrigerant that has changed into the low pressure-low temperature gas by the expansion valve 38, absorb heat from the surround air. Since the refrigerant absorbs heat from the surround air in the evaporator 40, an air present around the evaporator is cooled to produce a cooling effect.

The expansion valve 38 and the evaporator 40 are integrated into a cooling unit 42 attached so as to face a vehicle interior. On one end of the cooling unit 42, an air intake port 42A opens so as to allow an air to be forcefully supplied thereto by, for example, a centrifugal blower 44.

In the compressed air supply apparatus 10, at least a part of a first pipe 20 through which the air compressor 12 communicates with the tank 14, is disposed so as to be cooled by the evaporator 40 constituting the heat pump 30. Specifically, at least a part of the first pipe 20 is disposed in the vicinity of an air exit side of the evaporator 40, or disposed so that it contacts with a cooling fin of the evaporator 40.

According to such a compressed air supply apparatus 10, a compressed air produced by the air compressor 12 and thereby having a high temperature, is cooled by the evaporator 40 constituting the heat pump 30 to a temperature at which an oil content and a water content are condensed or to a lower temperature. Accordingly, when the compressed air is supplied to the tank 14, the oil content and the water content are condensed and adhere to its inner wall. The oil content and the water content adhered to the inner wall of the tank 14 are accumulated by gravity into a lower portion of the tank 14 and removed. Here, since the oil content and the water content are removed by using condensation, they can be removed even if they have fine particle sizes. Further, since the oil content and the water content accumulated in the lower portion of the tank 14 are periodically removed by the auto drain valve 14B, maintenance of the tank 14 is unnecessary or reduced.

The compressed air temporarily stored in the tank 14 passes through the oil mist separator 16 and the air dryer 18 before it is supplied to various devices, thus enabling to further remove the oil content and the water content that have not been removed by condensation. Accordingly, it is possible to address various devices requiring cleaner compressed air.

Here, since a certain degree of the oil content and the water content are removed by condensation in the tank 14, it is possible to reduce the size of the oil mist separator 16 and the air dryer 18. Further, if no problem occurs in devices using a compressed air as a working fluid, it is possible to omit at least one of the oil mist separator 16 and the air dryer 18. In short, it is sufficient that at least one of the oil mist separator 16 and the air dryer 18 be disposed in a second pipe 22 to be connected to the delivery port 14A of the tank 14, as the situation requires.

In the above-described embodiment, in order to efficiently cool the compressed air by the evaporator 40, the following construction may be added. Here, with respect to constructions common to those of the embodiment illustrated in FIG. 1, the same reference signs are applied and their explanations are omitted.

Figure 2:
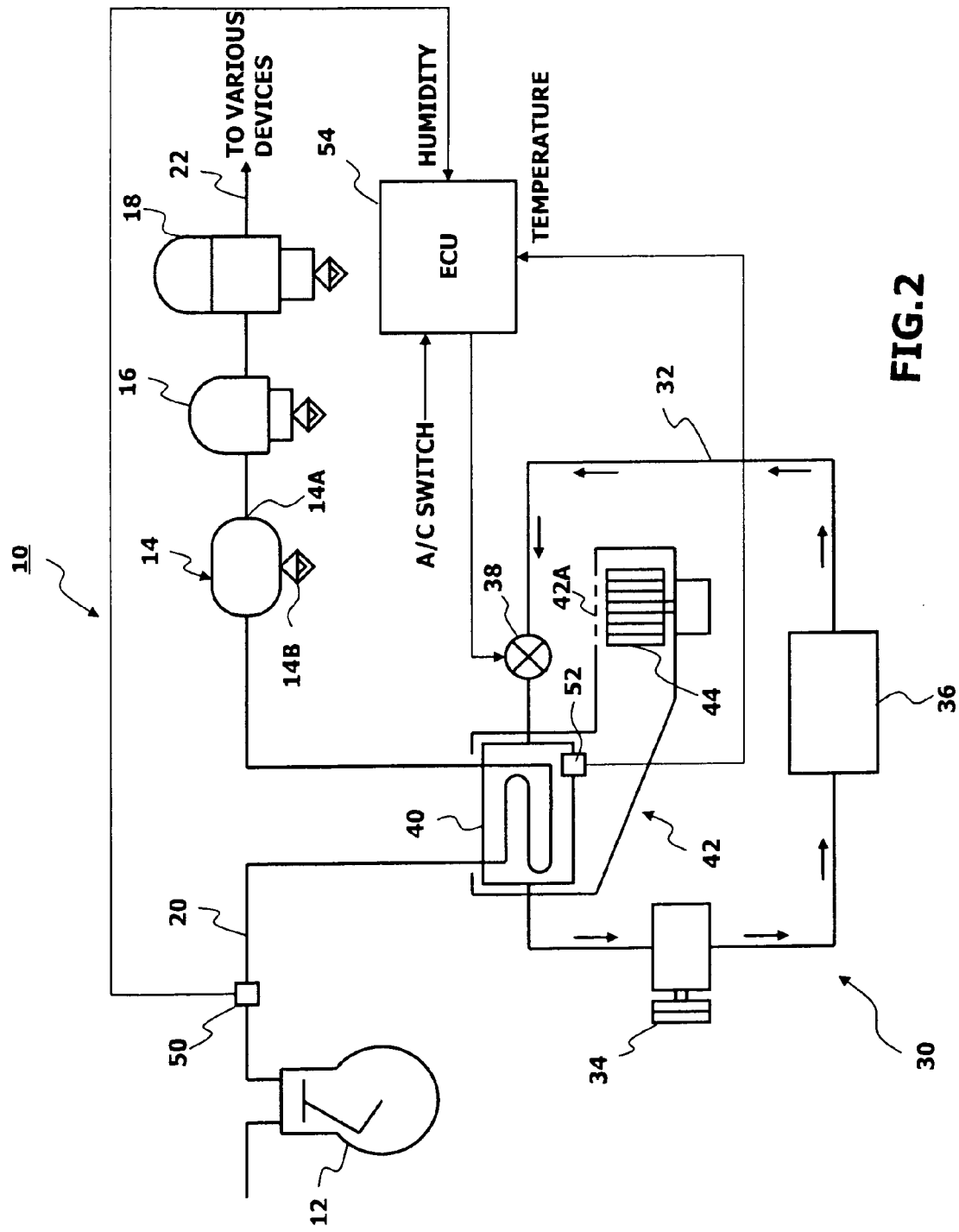
FIG. 2 is a schematic view of a vehicle on which a compressed air supply apparatus according to a second embodiment is mounted.

That is, as illustrated in FIG. 2, in the first pipe 20 disposed between the air compressor 12 and the evaporator 40, a humidity sensor 50 for detecting the humidity of a compressed air discharged from the air compressor 12 is attached. Furthermore, to the evaporator 40, a temperature sensor 52 for detecting the temperature of the evaporator 40 is attached. Signals of the humidity sensor 50 and the temperature sensor 52 are input to a control unit 54 having a computer. The control unit 54 executes a control program stored in, for example, a ROM (Read Only Memory) to electronically control the opening degree of the expansion valve 38. Here, the control unit 54 may, for example, be integrated into a control unit for electronically controlling an air conditioner.

Figure 3:
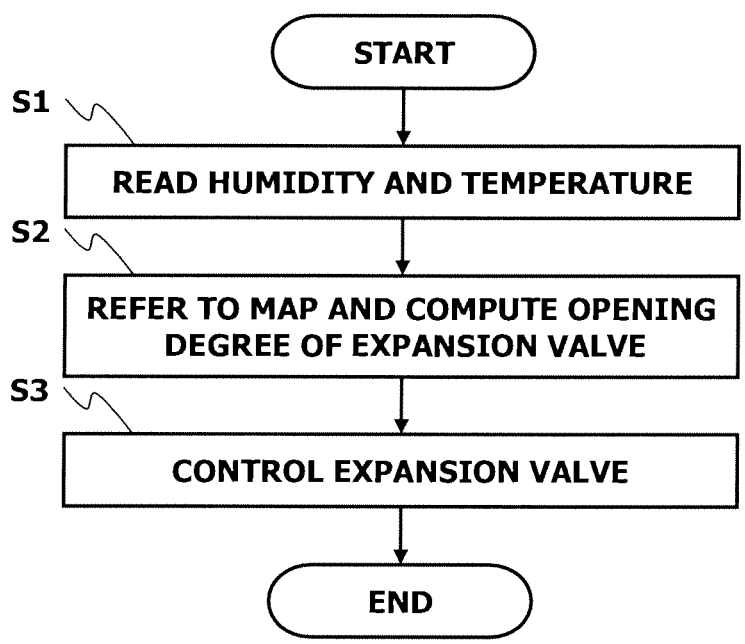
FIG. 3 is a flow chart illustrating a control program of the second embodiment.

FIG. 3 illustrates a control of the expansion valve 38 repeatedly executed by the control unit 54 at first predetermined time intervals after start of an engine.

In Step 1 (which is abbreviated as "S1" in the drawings; the same rule is applied hereinafter), the control unit 54 reads a humidity of a compressed air from the humidity sensor 50 and reads a temperature of the evaporator 40 from the temperature sensor 52.

In Step 2, the control unit 54 refers to a map that defines the opening degree of the expansion valve 38 in relation to the humidity of the compressed air and the temperature of the evaporator 40, and computes an opening degree corresponding to the humidity and the temperature read in Step 1. Here, the map defines, for example, an opening degree at which a compressed air flowing through the first pipe 20 is cooled to a temperature below the dew points of an oil content and a water content, that is obtained by, for example, experiment, that is, an opening degree at which a compressed air flowing through the first pipe 20 is cooled to a temperature at which the oil content and the water content are condensed or to a lower temperature.

In Step 3, the control unit 54 controls the expansion valve 38 so that its opening degree becomes one computed in Step 2.

Thus, the opening degree of the expansion valve 38 is dynamically controlled to cool the compressed air to a temperature at which the oil content and the water content are condensed or a lower temperature based on the humidity of the compressed air discharged from the air compressor 12 and the temperature of the evaporator 40. Accordingly, it is not necessary to operate the heat pump 30 always at a high load in order to remove the oil content and the water content from the compressed air, and it is possible to save energy for operating the compressor 34. Here, when an opening degree for maintaining a vehicle interior temperature set by, for example, a vehicle driver is greater than the opening degree for removing the oil content and the water content from the compressed air, it is sufficient that the temperature setting be prioritized.

Here, even when, for example, a vehicle driver does not desire operation of the air conditioner, specifically, even when the driver turns OFF an air conditioner switch, the heat pump 30 continues to run to cool the compressed air. In this case, a cool air, which has passed through the evaporator 40 to be cooled, is introduced into the vehicle interior, and such a state is against the intention of, for example, the vehicle driver. To solve this problem, the following construction may be further added.

Figure 4:
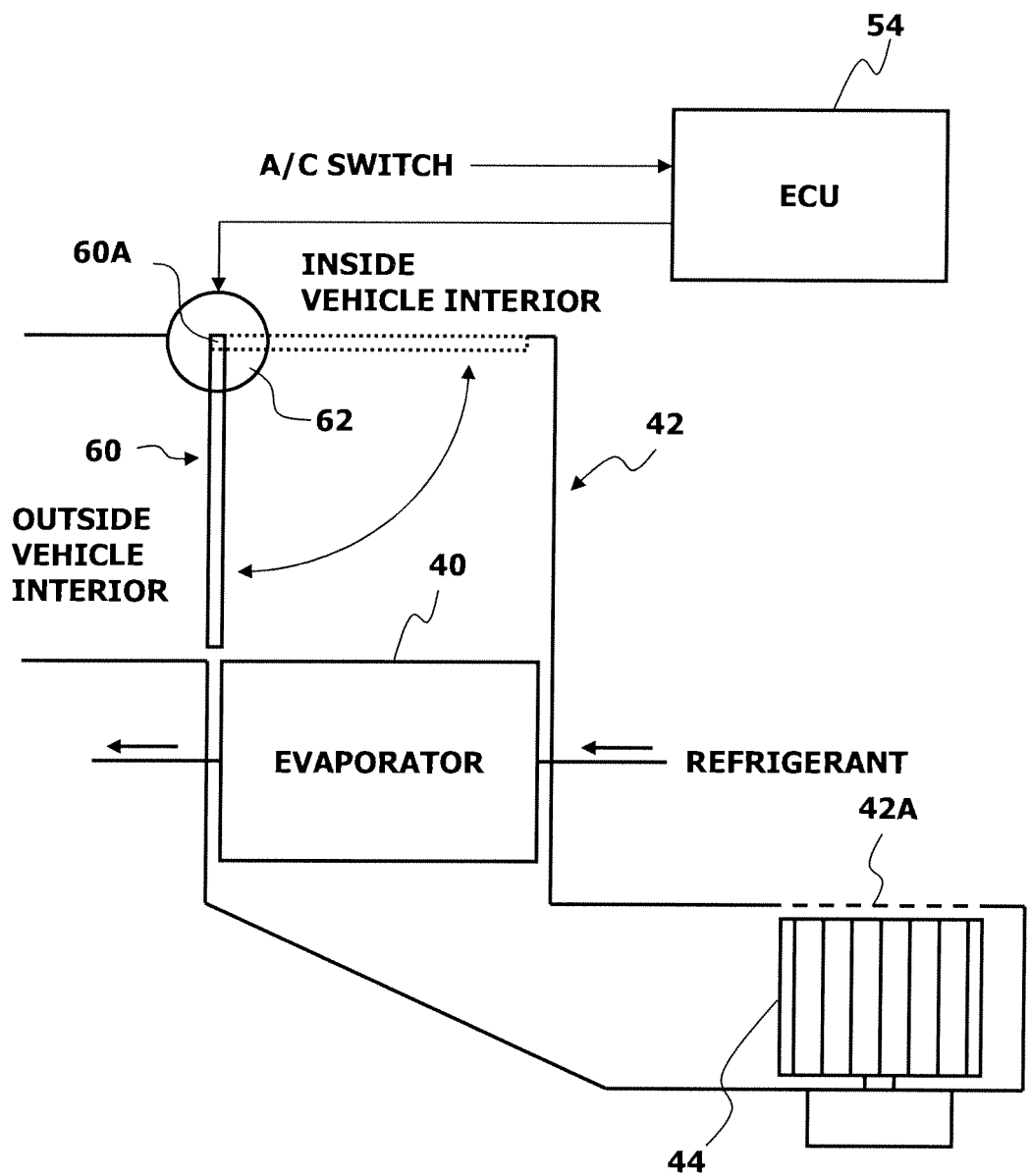
FIG. 4 is a schematic view of a vehicle on which an air conditioning system according to a third embodiment is mounted.

As illustrated in FIG. 4, to the other end portion of the cooling unit 42, that is, to a cool air exit side of the evaporator 40, for example, a door 60 including a plate-shaped member is rotatably attached, which is configured to selectively switch between introduction of the cool air into the vehicle interior and discharge of the cool air to the outside of the vehicle interior. To the rotation axis 60A of the door 60, for example, an actuator 62 such as an electric motor is connected.

To the control unit 54, an output signal of an air conditioner switch operated by, for example, a vehicle driver, is input. The air conditioner switch outputs an ON signal when operation of the air conditioner is desired, and outputs an OFF signal when operation of the air conditioner is not desired. The control unit 54 controls electronically the actuator 62 for rotating the door 60 according to the signal of the air conditioner switch.

Here, the door 60 and the actuator 62 are mentioned as an example of the selection device, and the control unit 54 is mentioned as an example of the control device.

Figure 5:
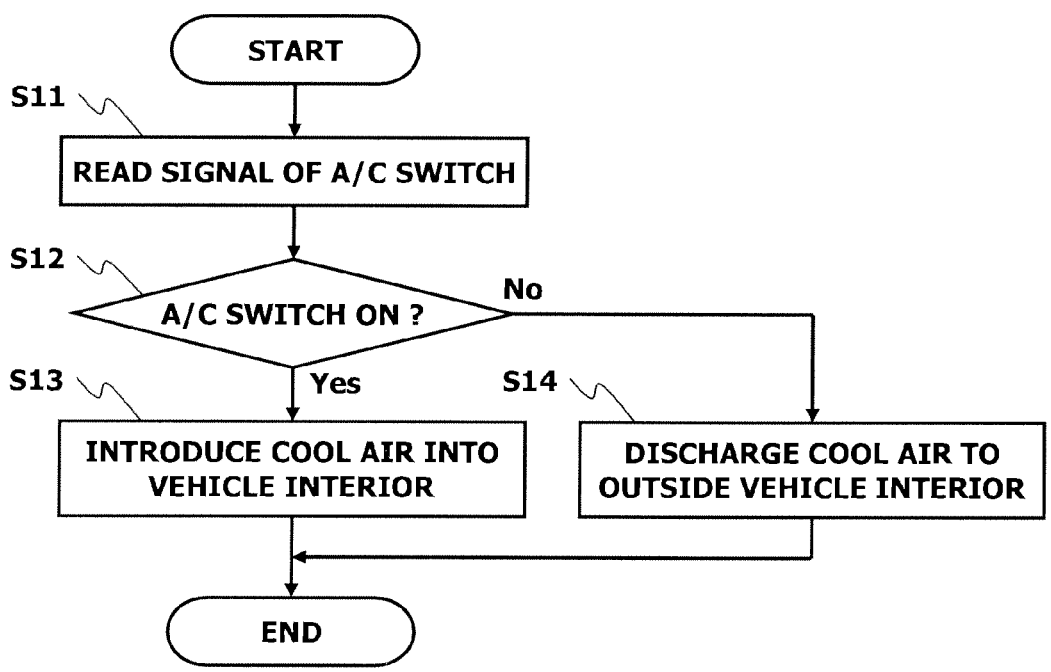
FIG. 5 is a flow chart illustrating a control program of the third embodiment.

FIG. 5 illustrates a control of the actuator 62 repeatedly executed by the control unit 54 at second predetermined time intervals after start of an engine. Here, the second predetermined time interval may be the same as the first predetermined time interval.

In Step 11, the control unit 54 reads the signal of the air conditioner switch.

In Step 12, the control unit 54 judges whether or not the air conditioner switch is ON. When the control unit 54 judges that the air conditioner switch is ON (Yes), it proceeds with the process to Step 13. On the other hand, when the control unit 54 judges that the air conditioner switch is OFF (No), it proceeds with the process to Step 14.

In Step 13, the control unit 54 controls the actuator 62 for rotating the door 60 so as to rotate the door 60 to the position indicated by the solid line in order to allow a cool air be introduced into the vehicle interior.

In Step 14, the control unit 54 controls the actuator 62 for rotating the door 60 so as to rotate the door 60 to the position indicated by the broken line in order to discharge the cool air to the outside of the vehicle interior.

By such a configuration, since the cool air is discharged to the outside of the vehicle interior when the air conditioner switch is OFF, it is possible to eliminate discomfort felt by, for example, a vehicle driver due to introduction of the cool air into the vehicle interior. Here, the actuator 62 for rotating the door 60 is not limited to one electronically controlled by the control unit 54, and it may be one controlled by a relay actuated by the signal of the air conditioner switch. In this case, the relay is mentioned as another example of the control device.

Figure 6:
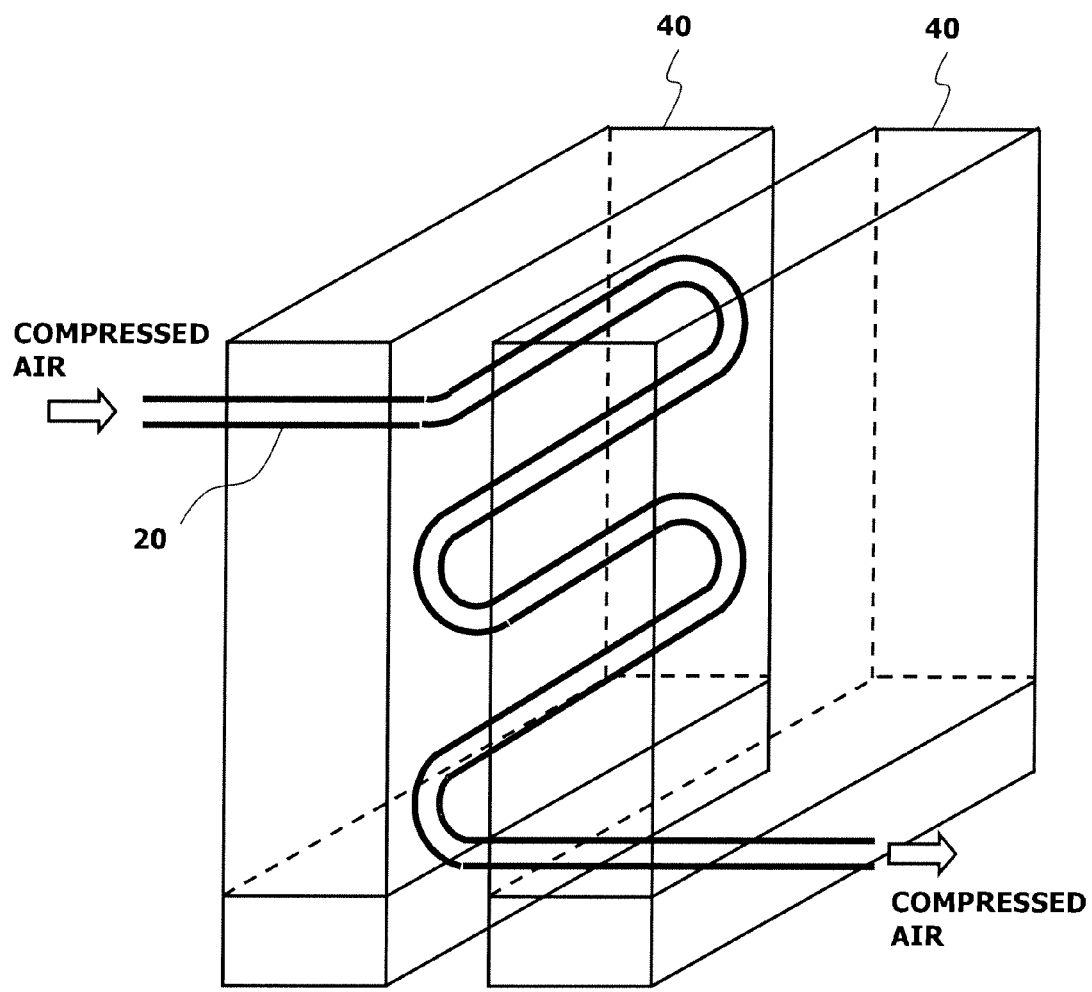
FIG. 6 is a perspective view illustrating a construction for supplementing shortage of cooling capacity of an evaporator.

Since the evaporator 40 is used not only for providing a cooling function of the air conditioner but also for cooling the compressed air, its capacity may become insufficient. In such a case, as illustrated in FIG. 6, a pair of evaporators 40 may be provided to sandwich a part of the first piping 20 therebetween.

What is claimed is:

1. A compressed air supply apparatus comprising:
    an air compressor configured to compress air to at least atmospheric pressure;
    a tank configured to store a compressed air produced by the air compressor, the tank having a supply port configured to supply the compressed air to various devices that use the compressed air as a working fluid;
    a first pipe that connects the air compressor to the tank;
    a heat pump of an air conditioner, the heat pump comprising an evaporator configured to cool at least a part of the first pipe;
    a selection device configured to select whether a cool air cooled by the evaporator is introduced into a vehicle interior or the cool air is discharged to an outside of the vehicle interior, the cool air being fluidly distinct from the compressed air; and
    a control device configured to control the selection device so that the cool air is introduced into the vehicle interior when an air conditioner switch is turned ON and that the cool air is discharged to the outside of the vehicle interior when the air conditioner switch is turned OFF.

2. The compressed air supply apparatus according to claim 1, further comprising an auto drain valve that is attached to a bottom portion of the tank and configured to periodically discharge an oil content and a water content accumulated in the tank.

3. The compressed air supply apparatus according to claim 1, further comprising:
    a humidity sensor configured to detect a humidity of the compressed air discharged from the air compressor;
    a temperature sensor configured to detect a temperature of the evaporator; and
    a control unit having a computer;
    wherein the heat pump further comprises an expansion valve, and
    wherein the control unit is configured to control an opening degree of the expansion valve based on the humidity detected by the humidity sensor and the temperature detected by the temperature sensor so that the compressed air flowing through the first pipe is cooled to a temperature below dew-point temperatures of an oil content and a water content.

4. The compressed air supply apparatus according to claim 1, further comprising at least one of an oil mist separator configured to remove an oil content contained in the compressed air and an air dryer configured to remove a water content contained in the compressed air, which are disposed in a second pipe that is connected to the supply port of the tank.

5. The compressed air supply apparatus according to claim 1, wherein at least a part of the first pipe is sandwiched between a pair of evaporators.

* * * * *